(12) United States Patent
Couturet et al.

(10) Patent No.: US 7,743,682 B2
(45) Date of Patent: Jun. 29, 2010

(54) AUTOMATIC BICYCLE PEDAL WITH ENGAGEMENT ARCHES

(75) Inventors: Jean-Pierre Couturet, Nevers (FR); Julien Pierre Jacques Bouchez, Saint German des Pres (FR)

(73) Assignee: Look Cycle International, Nevers (FR)

( * ) Notice: Subject to any disclaimer, the term of this patent is extended or adjusted under 35 U.S.C. 154(b) by 912 days.

(21) Appl. No.: 11/585,886

(22) Filed: Oct. 25, 2006

(65) Prior Publication Data

US 2007/0137431 A1   Jun. 21, 2007

(30) Foreign Application Priority Data

Oct. 28, 2005   (FR) .................................. 05 11110

(51) Int. Cl.
*B62M 3/00* (2006.01)

(52) U.S. Cl. ..................................... 74/594.6

(58) Field of Classification Search .................. 74/560, 74/594.4, 594.6; 36/131
See application file for complete search history.

(56) References Cited

U.S. PATENT DOCUMENTS

| | | | |
|---|---|---|---|
| 4,840,086 A | 6/1989 | Bidal et al. | |
| 5,787,764 A * | 8/1998 | Peyre | 74/594.6 |
| 6,205,885 B1 | 3/2001 | Hermansen et al. | |
| 6,640,663 B1 | 11/2003 | Steinberg | |
| 7,258,042 B2 * | 8/2007 | Couturet et al. | 74/594.6 |
| 2002/0066337 A1 | 6/2002 | Byrne | |
| 2007/0137429 A1 * | 6/2007 | Wang | 74/594.6 |

FOREIGN PATENT DOCUMENTS

| | | |
|---|---|---|
| DE | 91 04 710 | 6/1991 |
| FR | 2691696 | 12/1993 |
| FR | 2809701 | 12/2001 |
| FR | 2822127 | 9/2002 |
| FR | 2822433 | 9/2002 |
| WO | 99/14107 | 3/1999 |

* cited by examiner

*Primary Examiner*—Vicky A Johnson
(74) *Attorney, Agent, or Firm*—Young & Thompson

(57) ABSTRACT

A pedal includes a pedal body (1) mounted rotatably on a pedal axle (2) and having at least two arches (7) for engaging an engagement member (8) fixed below a cyclist's shoe. The arches have opposite branches connected to the pedal body and they are disposed one after the other about the periphery of the pedal body (1) so as to define between them an engagement surface for the engagement member (8) against the pedal body (1). The two arches (7) are adapted to be urged toward each other by resilient return elements returning them to a retention position for the engagement member (8). At least one of the at least two arches is a resilient arch constituting the resilient return elements, and the ends of this resilient arch have bending axes that are offset relative to each other.

19 Claims, 3 Drawing Sheets

AUTOMATIC BICYCLE PEDAL WITH ENGAGEMENT ARCHES

The present invention relates to an automatic bicycle pedal permitting the securement of a cyclist's shoe against an engagement surface provided on the pedal.

The notion of "automatic" is connected to the fact that the shoe carries a coupling member or retaining cleat in the form of a plate fixed below the shoe sole of the cyclist and adapted to engage a hands-free securement by simply pressing this cleat against retaining means provided on the pedal. These latter are connected to a pedal body mounted rotatably on a pedal axle adapted to be connected to a pedal crank. They generally comprise a fixed engagement member for the cleat and a rear movable retaining member which can be resiliently swung between a provision to release the cleat and a retaining position of this latter against an engagement surface on the body of the pedal.

There are known a large number of pedals of this type which differ from each other essentially by the use of automatic retaining means used to connect the cleat to the pedal body. They all have it in common that they comprise resilient return means for the rear movable retaining member, in general constituted by a helicoidal spring, or sometimes by a leaf spring, which pre-stresses this member toward a retaining position of the engagement member on the pedal body.

The first automatic pedals comprised only a single engagement surface, and later, with the advent of the all-terrain cycle (ATC) there have been automatic pedals of a double engagement surface in which the retaining means are duplicated on two engagement surfaces that are diametrically opposite from each other on the pedal body. The return means can, in these pedal, be separated or in common for the two engagement surfaces. The advantage of a two-faced engagement pedal is that the cyclist is not obliged to seek the side of the pedal provided with the retaining means for the cleat, whilst he can be able quickly to reengage to better ensure his balance whilst continuing to look to the front.

The presence of dirt in this type of device and the difficulty to which it gives rise as to the operation of the retaining means of the cleat, has led to the search to facilitate the discharge of this by hollowing out as much as possible the pedal body, as well as improving the engagement by the smallest possible members. Thus there have appeared in particular retaining members in the form of arches made of metallic wire.

An example of a pedal provided with such arches is found in U.S. Pat. No. 6,205,885, which discloses an automatic pedal provided with four engagement faces, which is to say four engagement faces 90° from each other. The retaining means of a cleat fixed below the shoe sole of the cyclist comprises according to this patent a first pair of arches constituted by a rigid metallic wire. These arches are secured to the pedal body and mounted diametrically opposed from each other on the latter. A second pair of arches, also constituted by rigid wires, is mounted pivotably between the fixed arches, on opposite sides of the pedal body. The pivoting arches are rigidly connected to each other and are rotatably mounted about the pedal axle whilst being urged toward a retaining position for the cleat by resilient return means in the form of a helicoidal spring threaded on a socket of the pedal body extending about the pedal axle.

This pedal thus has four engagement surfaces for the cleat on the body of the pedal, each engagement surface being defined between a pivoting arch and a fixed arch. The cleat can easily be emplaced on such an engagement surface during an engagement phase by angularly separating one pivoting arch from an adjacent fixed arch located in front of or behind the pivoting arch. The cleat can then in known manner per se be freed from the engagement plane by a rotation movement of the shoe during a phase of disengagement of the cleat. This technique is well known in this field and will not be further described in detail.

However, the pedal according to U.S. Pat. No. 6,205,885 has a certain number of drawbacks, among others:
the relative positioning of the movable arches relative to the fixed arches is ensured by a single return spring, whilst the balance of the forces of the angular movements requires a precision difficult to obtain with a member of this type;
the use of double fixed arches and double movable arches give rise necessarily to an even pair of the engagement surfaces, which limits the possibilities;
the arches are interfitted within each other and must contain the return spring, which gives rise to troublesome requirements during design as well as requirements for the production and difficulties during assembly.

The invention has for its object to overcome these drawbacks, by providing an automatic pedal of this type which is simple to make and to assemble, and which comprises engagement arches quite independent from each other so as thereby to permit a desirable number, odd or even, of engagement surfaces for a cleat.

The object of the invention is an automatic bicycle pedal, comprising a pedal body mounted rotatably on a pedal axle and provided with retaining means for an engagement member fixed below a cyclist's shoe, said retaining means comprising at least two arches having opposite branches connected to said pedal body, said at least two arches being disposed one after the other about the periphery of said pedal body so as to define between them an engagement surface for said engagement member against said pedal body, said at least two arches being adapted to be urged toward each other by resilient return means returning them to a retaining position for said engagement member against said engagement surface, characterized by the fact that at least one of said at least two arches is a resilient arch constituting moreover said resilient return means, and that the ends of said resilient arch have axes of bending offset relative to each other.

According to other characteristics of the invention:
said bending axes are defined in an internal recess respectively in an external recess of the arch on said pedal body, and that said internal and external recesses are angularly offset relative to each other about the rotation axle of the pedal;
the branches of each arch have different lengths;
the shorter branch of said branches of each arch is the internal branch;
the branches of each arch are located in different planes when the arch is pre-stressed;
one of said at least two arches is a rear arch formed by a respective resilient metal wire constituting said return means;
said at least two arches are formed by a respective resilient metallic wire constituting said return means;
said arches are four in number and said internal and external recesses are regularly spaced 90° apart so as to receive the ends of the arches in a manner to define four engagement surfaces between themselves;
said arches are three in number and the external recesses are regularly distributed 120° from each other so as to receive the ends of the arches in a manner to define between them three engagement surfaces;

said internal and external recesses extend substantially parallel to the axis of the pedal body and are disposed on the same circle centered on the axis of rotation of the pedal;

each internal recess of an arch is aligned on an external recess of an adjacent arch;

said recesses are formed by bores and the ends of the arches have a complementary cylindrical shape;

said external recesses are provided on an axially external support element connected to the pedal body;

said external element is fixed to the pedal body with the help of a pin passing through holes provided in said external support element and in said pedal body;

said internal recesses are provided on an axially internal support element connected to the pedal body;

said internal element is fixed to the pedal body with the help of two pins passing through holes provided in said internal support element so as to extend on opposite sides of said pedal axis;

the two ends of a same arch are directed inwardly, said external recesses being provided on an end surface of the pedal body;

an end element is fixed to said end surface of said pedal body so as to cap the latter;

said arches bear partially against a movable ring threaded on the end of the pedal body so as to permit the adjustment of the pre-stress of the arches as a function of the thickness of said ring; and said arches partially bear against bearing surfaces provided in the recesses provided on said pedal body.

Other characteristics and advantages of the invention will become apparent from the description which follows, of two non-limiting embodiments of the invention, with reference to the accompanying drawings, in which.

In the drawings, identical or equivalent elements will have the same reference numerals.

Figure 1:
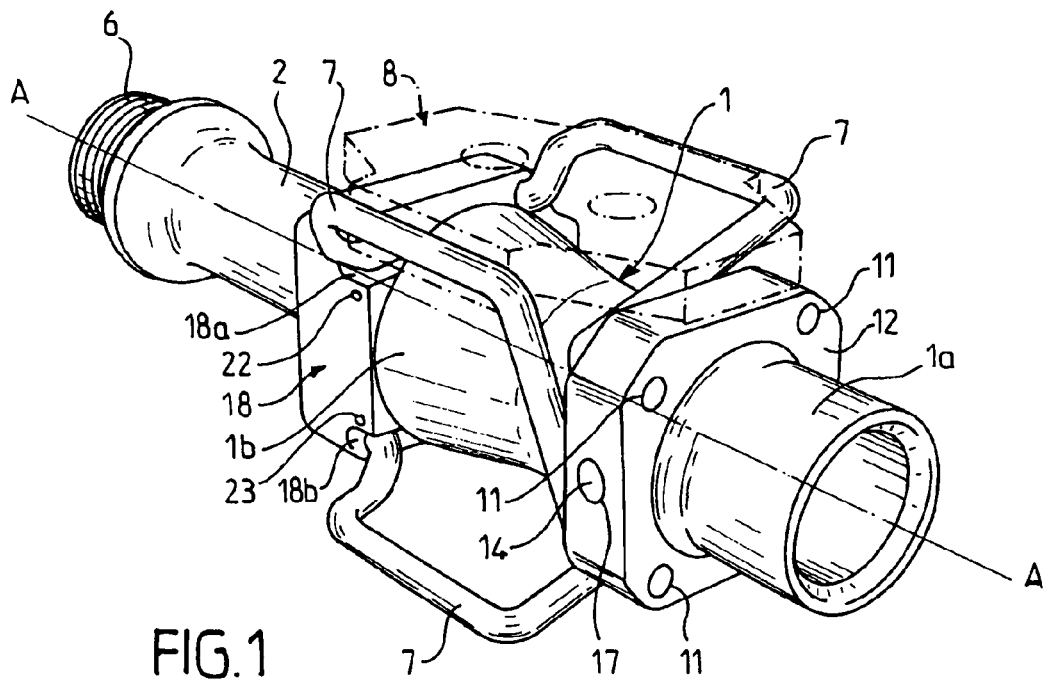
FIG. 1 is a perspective view of a first embodiment of an automatic pedal with arches according to the invention, comprising four engagement surfaces.

A first embodiment of the automatic pedal with four engagement surfaces according to the invention will now be described with reference to FIGS. 1 to 4.

The automatic pedal comprises a pedal body 1 mounted rotatably on a pedal axle 2 by means of rollers 3, 4 and a retaining ring 5. The pedal axle comprises at one of its ends a screw thread 6 adapted to coact with a tapping on a pedal crank of the bicycle (not shown) so as to ensure the connection between these elements.

The pedal is provided with U shaped arches 7 disposed one after the other about the periphery of the pedal body 1 so as to constitute retaining means for an engagement member in the form of a plate 8 fixed below the cyclist's shoe (not shown in the drawings).

In the example of the first embodiment shown in FIGS. 1 to 4, the arches are four in number.

Each arch 7 is constituted by a metallic wire overall in the shape of a U having a central portion extending substantially parallel to the pedal axle 2 and connected to two lateral portions in the form of internal and external branches extending substantially perpendicularly to the axle of the pedal.

The ends of the arch 7 are bent laterally about 90° to be received in recesses provided on the pedal body 1 and extending substantially parallel to the axis of this latter. The ends of each arch are more precisely received in an axially internal recess 10 and an axially inner recess 10 and an axially outer recess 11.

These inner and outer recesses are regularly spaced at an angle α of 90° relative to each other. The four arches thus define between themselves the four engagement surfaces 9 (see FIG. 4) regularly distributed about the periphery of the pedal body 1.

According to the invention, the metallic wire of the arch is resilient so as to constitute moreover a resilient return means for the arch by using the innate resilience of this latter. According to an essential characteristic of the invention, the ends of this resilient arch have bending axes B-B respectively C-C offset from each other, which is to say that the bending axes are not aligned (see FIGS. 3 and 4).

According to another characteristic of the invention, the inner recess 10 and the outer recess 11 of the arch are angularly offset relative to each other about the rotation axis A-A of the pedal. They permit the pre-stressing of the arch by the application of the combined flexural and torsional forces during assembly of the pedal, as will be explained in greater detail in what follows.

Figure 4:
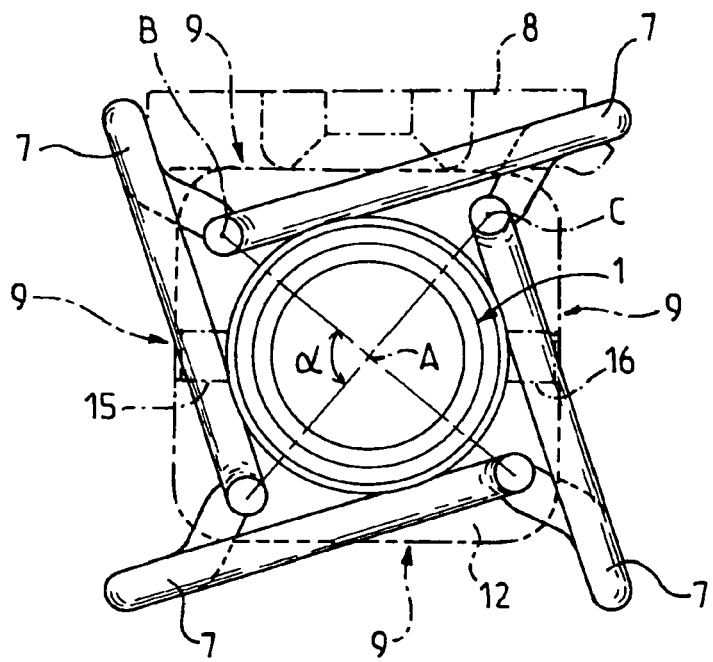
FIG. 4 is a schematic end view of the pedal of FIGS. 1 to 3 showing the angular offset between the ends of a same arch.

As a result, the branches of each arch 7 have different lengths, the shorter branch being the inner branch, whilst the longer branch is the outer branch which rests against the pedal body 1 so as to be urged laterally outwardly, which ensures that the two branches of the arch will not be disposed in the same plane (see FIG. 4). Thus, the planes of the two branches of the arch form an acute angle when the arch is pre-stressed during assembly of the pedal.

In the illustrated example, this pedal body 1 has the shape of a body of a revolution with a first outer cylindrical portion 1a followed by an inner truncated conical portion 1b having its flared end directed inwardly.

Thanks to its resilience, the arch 7, which can be pre-stressed or not, is adapted to be resiliently deformed when it is subjected to the combined stresses of flexure and torsion during engagement of said engagement member against said engagement surface and during its release from the latter.

Preferably, the recesses 10, 11 are bores and the ends of the arches have a complementary cylindrical shape.

In the case of a single engagement surface delimited by two arches, it suffices that one of the arches, preferably the rear arch 7, will be formed by a resilient metal wire, whilst the front arch can be completely rigid.

In the case of an even number of arches, one out of two arches can also be formed by a resilient metallic wire.

In the example shown in FIGS. 1 to 4, the outer recesses 11 are provided on an axially outer connected support element 12 and connected to the pedal body 1. This outer support element 12 has the shape of an overall square plate which comprises a central through hole 13 permitting threading this element over the cylindrical portion 1a of the pedal body 1 by simultaneously introducing the ends of the arch 7 into the recesses 11 provided for this purpose on this outer support element.

Figure 2:
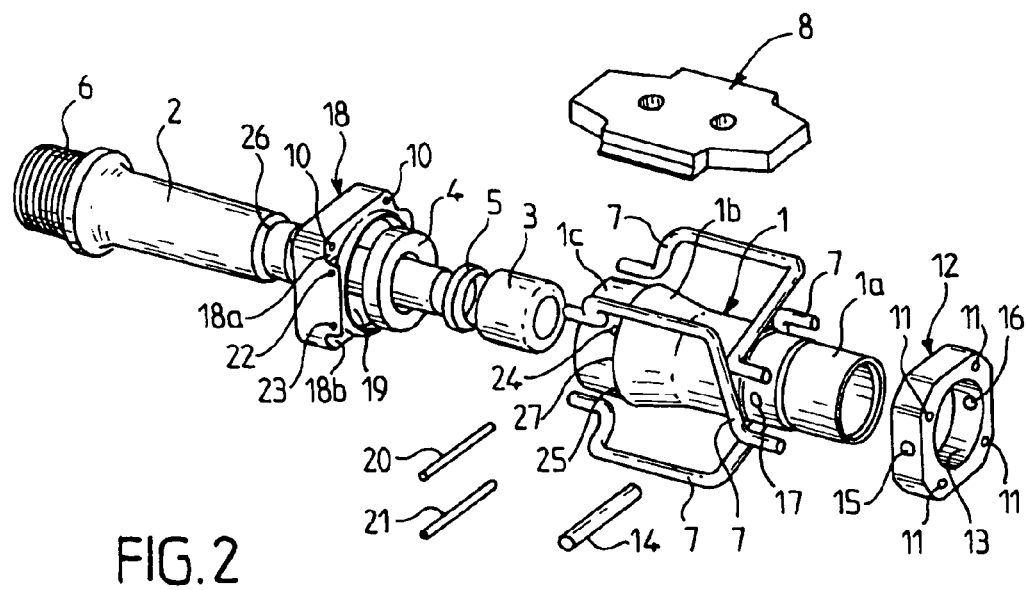
FIG. 2 is an exploded perspective view of the pedal of FIG. 1.

The outer support element 12 is, in the example illustrated in FIGS. 1 and 2, fixed on the pedal body 1 with the help of a pin 14 which extends through two through holes 15, 16 diametrically opposed, provided in this outer support element and two other through holes provided on the pedal body 1 and of which only one (17) is shown.

The inner recesses 10 are themselves provided on an inner axially connected support element 18 and connected to the pedal body 1. This inner support element 18 has shape analogous to that of the first support element 12 and comprises a central through hole 19 permitting threading this element on a second cylindrical portion 1c of the pedal body 1, which follows the truncated conical portion 1b and which has a diameter that is reduced relative to the flared end of this latter.

The inner support element 18 preferably comprises, on its end surface turned outwardly, respective upper and lower recesses 18a, 18b forming bearing surfaces for the short branches of the arches 7.

The inner support element 18 is in this case fixed on the pedal body 1 with the help of two pins 20, 21 which extend on opposite sides of the pedal axle 2 through two pairs of holes 22, 23 provided in this latter support element and two other corresponding pairs of holes 24, 25 provided on the pedal body 1. In each case, only one of the holes of each pair of holes is shown in the drawings.

The inner support element 18 is axially blocked on one side by a shoulder 26 on the pedal axle and a shoulder 27 formed in the transition region between the truncated conical portion 1b and the second cylindrical portion of reduced diameter 2c.

During assembly, it suffices to align the respective holes and to introduce therein the pins starting with the inner support element 18 which must be fixed on the pedal body 1 with the help of pins 20, 21. Then, the ends of the arches 17 are emplaced in their respective recesses 10 on the inner support 18, and finally the opposite ends of the arches 7 are emplaced in their respective recesses 11 on the outer support 12 which is threaded over the pedal body 1.

It is during this latter phase of assembly preferable to carry out an initial adjustment of the pre-stress of the arches by providing a slight rotation of the outer support element 12 so as to align the holes 15, 16, 17 receiving the pin 14 which fixes the outer support element on the pedal body.

Figure 3:
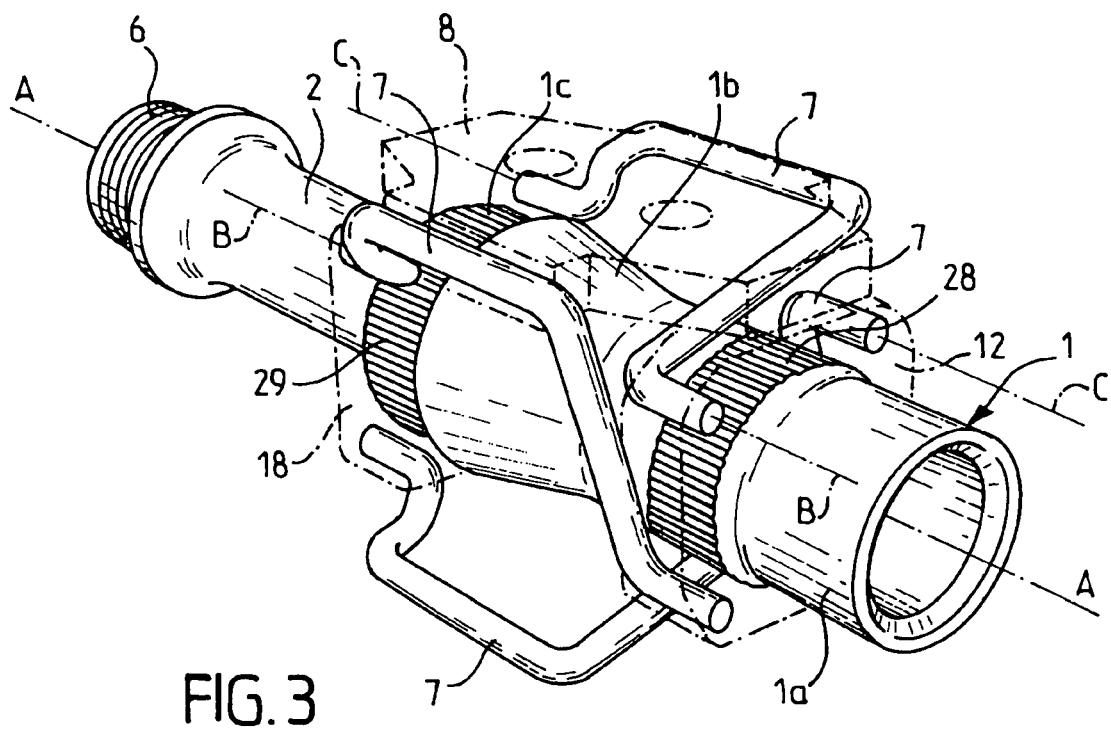
FIG. 3 is a perspective view of a modification of the pedal of FIGS. 1 and 2 showing among other things the arrangement of the arches on the pedal body.

FIG. 3 shows a modification of the first embodiment of the pedal shown in FIGS. 1 and 2. In this modification, the outer and inner support elements 12, 18 for the ends of the arches 7, similar to those already described, are used, with the difference however that in place of the pins 14, 20, 21 of the first modification, there are used grooves 28, 29 provided on the pedal body 1.

The grooves 28 are provided on a second of the first cylindrical portion 1a of the pedal body 1 so as to coact with the complementary groove (not shown) provided in central hole 13 of the outer support element 12, whilst the grooves 29 are provided on the second cylindrical portion 1c of the pedal body 1 so as to coact with the complementary groove (not shown) provided in the central hole 19 of the inner support element 18.

During assembly, one begins according to this embodiment, by causing the grooves of the inner support element 18 to coact with the grooves 29 of the second cylindrical portion 1c of the pedal body 1 and there are then introduced the ends of the arches 7 into their respective recesses 10 on the inner support 18, and finally the opposite ends of the arches 7 are emplaced in their respective recesses 11 on the outer support 12 whose grooves are caused to coact with the grooves 28 provided on the first cylindrical portion 1a of the pedal body 1.

It is during this phase of assembly preferable to carry out an initial adjustment of the pre-stress of the arches by providing a slight rotation of the outer support element 12 just before causing the grooves of the outer support element to coact with the grooves on the pedal body.

The outer support element 12 can, if it is not force fitted, be axially blocked in any manner, for example by gripping the outer end of the pedal body 1 or simply by a piece connected to this end.

Figure 5:
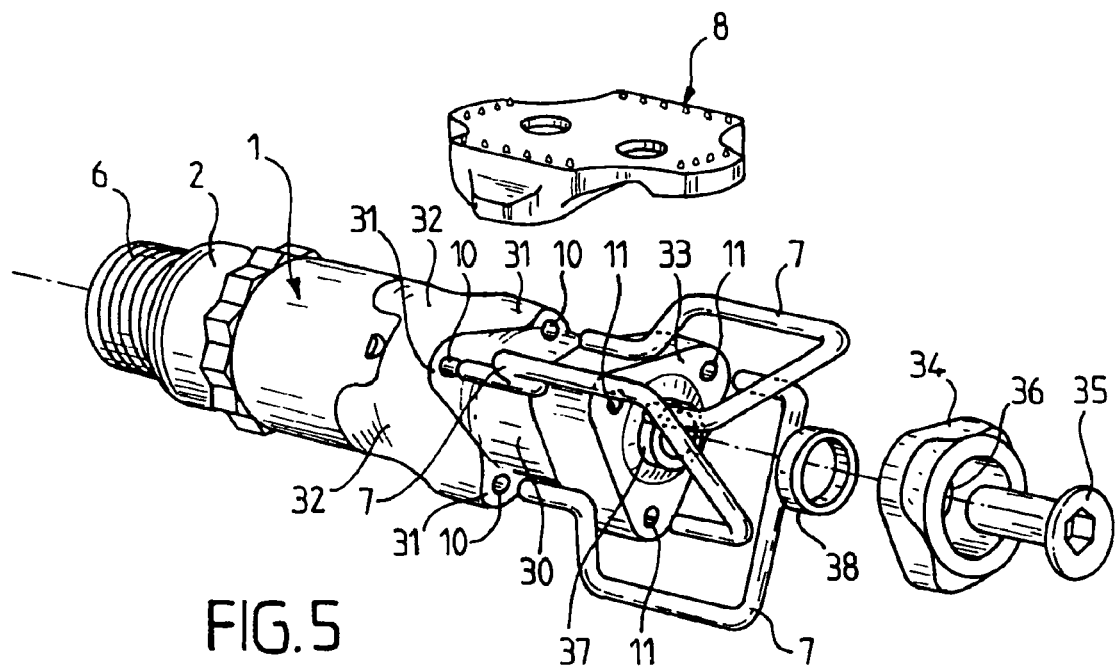
FIG. 5 is an exploded perspective view of a second embodiment of an automatic pedal with arches according to the invention, comprising three engagement surfaces.
Figure 6:
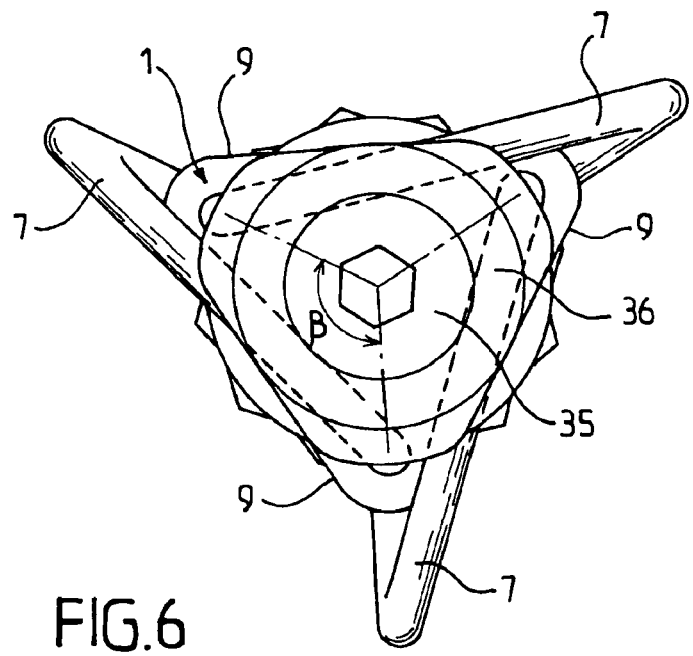
FIG. 6 is an end view of the pedal of FIG. 5.

A second embodiment of the automatic pedal according to the invention is shown in FIGS. 5 and 6.

The different principle relative to the first embodiment resides in the fact that the pedal of the second embodiment comprises three arches 7 in lieu of four and that the mounting of these arches on the pedal body 1 is different.

Not only the inner recesses 10 but also the outer recesses 11 of the arches 7 are in this embodiment provided directly in the pedal body 1, which has an overall cylindrical shape. The pedal body comprises a peripheral recess in the form of a throat 30 and the inner recesses 10 are provided in the axially internal wall of this throat, in a respective rounded projection 31. These projections are disposed in a triangle and connected to each other by flaps 32 constituting bearing surfaces for the sole of the cyclist's shoe.

The outer recesses 11 are provided in an end face 33 at the outer end of the pedal body 1, which has an overall triangular shape and this recess 11 is disposed adjacent a corresponding angle of this triangular shape. So as to permit the introduction of the outer ends of the arches 7, these latter are directed inwardly.

An end securement element 34 of a triangular shape corresponding to that of the end of the pedal body 1, will cap the end surface 33, with interposition of the long branches of the arches 7. The outer element 34 thus grips the long branches of the arches against the outer surface and is fixed to the pedal body by a screw 35 extending through a central hole 36 of this end element.

The lateral surfaces of the outer end of the pedal body 1, as well as the lateral surfaces of the end element 34, are flat and aligned on the flaps 32 of the pedal body so as to form supplemental bearing surfaces for the sole of the cyclist's shoe.

The pedal body 1 is on its end surface 33 provided with a small collar 37 against which the long branches of the arches bear to create the pre-stress of the arches during assembly. FIG. 5 shows a preferred modification in which an adjustment ring 38 is threaded on the small collar 37. This adjustment ring is removable and replaceable by another adjustment ring having a different thickness, such that the pre-stress of the arches 7 can be adjusted as a function of the thickness of the ring 38.

Moreover, the ends of each arch 7 are received in these inner (10) and outer (11) recesses which are regularly distributed at an angle $\beta$ of 120° relative to each other. The three arches thus define between themselves three engagement surfaces 9.

Not only in the first but also in the second embodiment, the inner and outer recesses are preferably disposed on the same circle, centered on the axis of rotation of the pedal.

Moreover, each inner recess 10 of an arch 7 is preferably aligned on an outer recess 11 of an adjacent arch, which permits piercing for example six recesses, two by two, in three piercing operations.

It follows from the preceding that the invention permits selecting any number of bearing surfaces 9 of the engagement member 8, this number being adapted to vary between a single one and about five bearing surfaces. It will be seen that the number four is an optimum number for automatic ATC pedals, whilst the number of three bearing surfaces can preferably be selected for roadway pedals.

In the case in which a single bearing surface is selected or an even number of bearing surfaces, it is possible to provide one out of two arches which is rigid and fixed permanently on the pedal body.

Of course, the invention is not limited to the illustrated and described examples and a large number of the characteristics described above can thus be combined by those skilled in the art who will have taken account of the same, which will permit them to design other modifications which are within the scope of the present invention.

The invention claimed is:

1. Automatic bicycle pedal, comprising a pedal body (1) mounted rotatably on a pedal axle (2) and provided with retaining means (7) for an engagement member (8) fixed below a cyclist's shoe, said retaining means comprising at least two arches (7) independent from one another having opposite branches connected to said pedal body, said at least two arches (7) being disposed one after the other about the periphery of said pedal body (1) so as to define between them an engagement surface (9) for said engagement member (8) against said pedal body (1), said at least two arches (7) being adapted to be urged toward each other by resilient return means returning them into a retaining position of said engagement member (8) against said engagement surface (9), at least one of said at least two arches being a resilient arch constituting moreover said resilient return means;

wherein the ends of said resilient arch are bent laterally and have bending axes (B-B, C-C) defined by an inner recess (10) and an outer recess (11), respectively, the arch (7) on said pedal body extending substantially parallel to the axis of the outer recess, said inner and outer recesses (10, 11) being angularly offset (α; β) relative to each other about the axis of rotation (A-A) of the pedal so as to offset the bending axes (B-B, C-C) relative to each other.

2. Automatic pedal according to claim 1, characterized by the fact that the branches of each arch (7) have different lengths.

3. Automatic pedal according to claim 2, characterized by the fact that the shorter branch of said branches of each arch (7) is the inner branch.

4. Automatic pedal according to claim 1, characterized by the fact that the branches of each arch (7) are located in different planes when the arch is pre-stressed.

5. Automatic pedal according to claim 1, characterized by the fact that one of said at least two arches (7) is a rear arch formed by a resilient metallic wire.

6. Automatic pedal according to claim 1, characterized by the fact that said at least two arches (7) are formed by a respective resilient metallic wire.

7. Automatic pedal according to claim 1, characterized by the fact that said arches (7) are four in number and that said inner and outer recesses (10, 11) are regularly distributed at 90° relative to each other so as to receive the ends of the arches (7) so as to define four engagement surfaces (9) between them.

8. Automatic pedal according to claim 1, characterized by the fact that said arches (7) are three in number and that said inner and outer recesses (10, 11) are regularly spaced 120° apart from each other so as to receive the ends of the arches in a manner to define between them three engagement surfaces.

9. Automatic pedal according to claim 1, characterized by the fact that said inner and outer recesses (10, 11) extend substantially parallel to the axis of said pedal body (1) and are disposed on the same circle centered on the axis of rotation (A-A) of the pedal.

10. Automatic pedal according to claim 1, characterized by the fact that each inner recess (10) of an arch (7) is aligned on an outer recess (11) of an adjacent arch (7).

11. Automatic pedal according to claim 1, characterized by the fact that said recesses (10, 11) are formed by bores and that the ends of the arches (7) have a complementary cylindrical shape.

12. Automatic pedal according to claim 1, characterized by the fact that said outer recesses (11) are provided on an axially outer support element (12) connected to the pedal body (1).

13. Automatic pedal according to claim 12, characterized by the fact that said outer support element 12 is fixed to the pedal body (1) with a pin (14) passing through holes (15, 16) provided in said outer support element (12) and in said pedal body (1).

14. Automatic pedal according to claim 12, characterized by the fact that said inner recesses (10) are provided on an axially inner support element (18) connected to said pedal body (1).

15. Automatic pedal according to claim 14, characterized by the fact that said inner support element (18) is fixed to the pedal body with the help of two pins (20, 21) passing through holes (22, 23) provided in said inner support element (18) so as to extend on opposite sides of said pedal axle (2).

16. Automatic pedal according to claim 1, characterized by the fact that the two ends of a same arch (7) are directed inwardly, said outer recesses (11) being provided on an end surface (33) of the pedal body (1).

17. Automatic pedal according to claim 16, characterized by the fact that an end element (34) is fixed to said end surface (33) of said pedal body (1) so as to cap the latter.

18. Automatic pedal according to claim 1, characterized by the fact that said arches (7) bear partially against a removable ring (38) disposed on the end of the pedal body (1) so as to permit the adjustment of the pre-stress of the arches (7) as a function of the thickness of said ring (38).

19. Automatic pedal according to claim 1, characterized by the fact that said arches (7) partially bear against bearing surfaces provided in recesses (18a, 18b) provided on said pedal body (1).

* * * * *